United States Patent
Veluru et al.

(10) Patent No.: US 11,834,953 B2
(45) Date of Patent: Dec. 5, 2023

(54) SEAL ASSEMBLY IN A GAS TURBINE ENGINE

(71) Applicant: Siemens Energy Global GmbH & Co. KG, Munich (DE)

(72) Inventors: Krishna Chaitanya Veluru, Jupiter, FL (US); Amit K. Paspulati, Charlotte, NC (US); Dimitri Zelmer, Oberhausen (DE); Anil L. Salunkhe, Charlotte, NC (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 114 days.

(21) Appl. No.: 17/597,127

(22) PCT Filed: Apr. 24, 2020

(86) PCT No.: PCT/US2020/029673
§ 371 (c)(1),
(2) Date: Dec. 27, 2021

(87) PCT Pub. No.: WO2020/263395
PCT Pub. Date: Dec. 30, 2020

(65) Prior Publication Data
US 2022/0228501 A1    Jul. 21, 2022

Related U.S. Application Data

(60) Provisional application No. 62/867,994, filed on Jun. 28, 2019.

(51) Int. Cl.
*F01D 11/00*    (2006.01)
*F04D 29/08*    (2006.01)
(Continued)

(52) U.S. Cl.
CPC ............ *F01D 11/00* (2013.01); *F04D 29/083* (2013.01); *F04D 29/541* (2013.01);
(Continued)

(58) Field of Classification Search
CPC .... F01D 11/00; F01D 11/005; F05D 2220/32; F05D 2240/56
See application file for complete search history.

(56) References Cited

U.S. PATENT DOCUMENTS 6,357,752 B1 * 3/2002 Lampes ............... F16J 15/3288
277/355
7,819,622 B2 * 10/2010 Paulino ................ F01D 25/246
415/137
(Continued)

FOREIGN PATENT DOCUMENTS

EP    1939404 P    7/2008
EP    2554879 A2    2/2013
(Continued)

OTHER PUBLICATIONS

PCT International Search Report and Written Opinion of International Searching Authority dated Jul. 28, 2020 corresponding to PCT International Application No. PCT/US2020/029673 filed Apr. 24, 2020.

*Primary Examiner* — Eldon T Brockman

(57) ABSTRACT

A seal assembly in a gas turbine engine is presented. The seal assembly is arranged at a forward side of an inner compressor exit diffusor. The seal assembly is arranged between an outlet guide vane assembly and the forward side of the inner compressor exit diffusor to reduce cooling air leakage therebetween or is arranged between adjacent outlet guide vane assemblies to reduce cooling air leakage ther-
(Continued)

ebetween. The seal assembly includes a plurality of seal segments. The seal assembly includes at least one seal, such as a brush seal.

8 Claims, 5 Drawing Sheets

(51) Int. Cl.
  *F04D 29/54* (2006.01)
  *F16J 15/3288* (2016.01)
(52) U.S. Cl.
  CPC ....... *F16J 15/3288* (2013.01); *F05D 2220/32* (2013.01); *F05D 2240/56* (2013.01)

(56) References Cited

U.S. PATENT DOCUMENTS

| | | | |
|---|---|---|---|
| 10,161,414 B2* | 12/2018 | Eastwood | F01D 9/023 |
| 2008/0145217 A1* | 6/2008 | Paulino | F01D 11/005 |
| | | | 415/209.2 |
| 2013/0033008 A1* | 2/2013 | Martin | F16J 15/3288 |
| | | | 277/641 |
| 2016/0169245 A1* | 6/2016 | Eastwood | F01D 9/023 |
| | | | 415/207 |

FOREIGN PATENT DOCUMENTS

| | | |
|---|---|---|
| EP | 3034797 A1 | 6/2016 |
| WO | 2014146866 A1 | 9/2014 |

\* cited by examiner

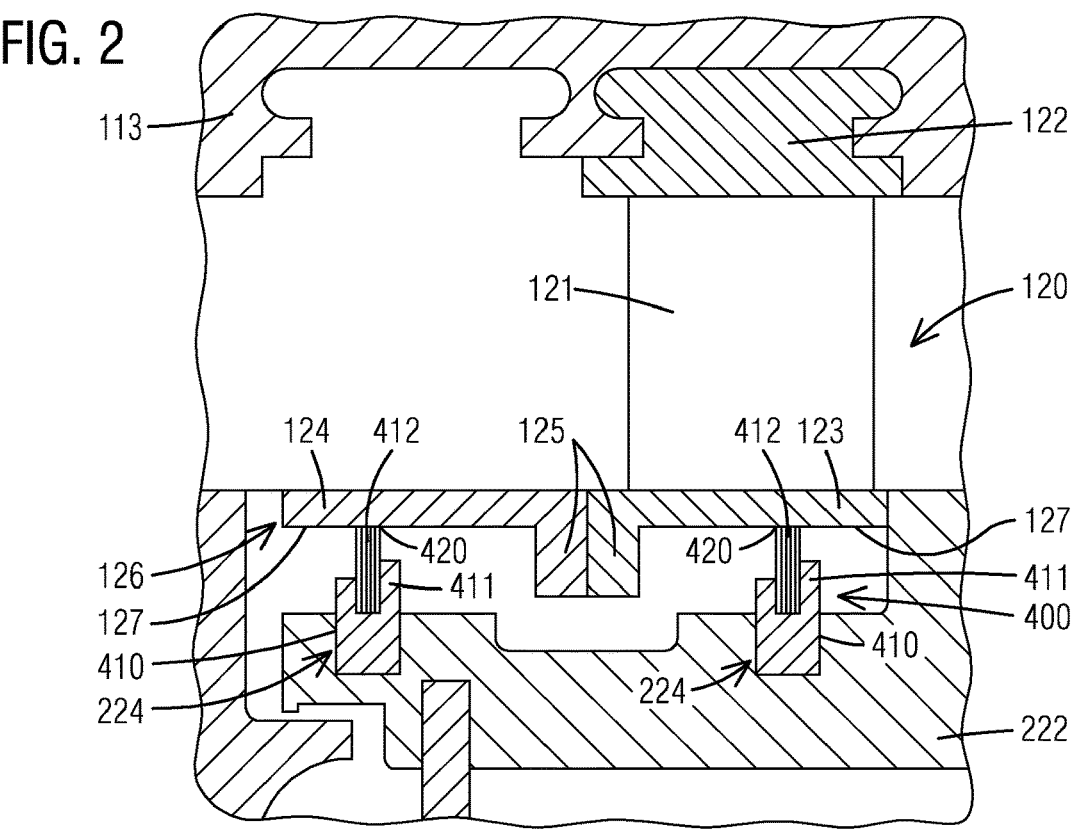
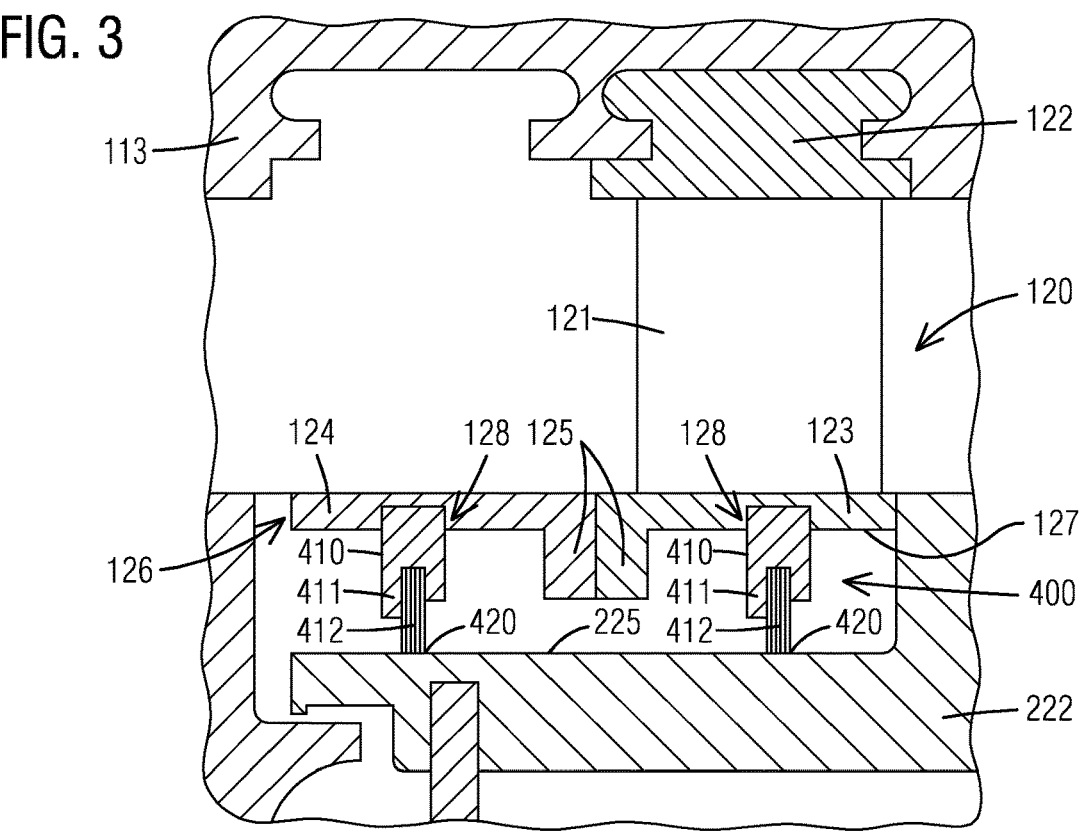

SEAL ASSEMBLY IN A GAS TURBINE ENGINE

TECHNICAL FIELD OF THE INVENTION

This invention relates generally to a seal assembly in a gas turbine engine, in particular, a seal assembly for reducing a cooling air leakage in a gas turbine engine.

DESCRIPTION OF THE RELATED ART

An industrial gas turbine engine typically includes a compressor section, a turbine section, and a mid-frame section disposed therebetween. The compressor section includes multiple stages of compressor blades and vanes and an outlet guide vane assembly aft of the last stage blade and vane. The mid-frame section typically includes a compressor exit diffusor and a combustor assembly. The compressor exit diffusor diffuses the compressed air from the compressor section into a plenum through which the compressed air flows to a combustor assembly which mixes the compressed air with fuel and ignites the mixture and transits the ignited mixture to the turbine section for mechanical power. The turbine section includes multiple stages of turbine blades and vanes. Due to the high temperature of the ignited mixture in the turbine section, cooling air is used to cool the turbine blades and vanes to maintain an adequate component life.

Typically, cooling air may be extracted by bleeding compressor air. However, bleeding air from the compressor may reduce the performance and efficiency of the gas turbine engine. Seals are typically arranged at the mid-frame section to reduce cooling air leakage. A reliable sealing system is important to the performance and efficiency of the gas turbine engine.

SUMMARY OF THE INVENTION

Briefly described, aspects of the present invention relate to a gas turbine engine, a seal assembly in a gas turbine engine, and a method for reducing a leakage in a gas turbine engine.

According to an aspect, a gas turbine engine is presented. The gas turbine engine comprises a compressor section comprising an outlet guide vane assembly. The gas turbine engine comprises a mid-frame section arranged downstream of the compressor section. The mid-frame section comprises an inner compressor exit diffuser. The outlet guide vane assembly interfaces with a forward side of the inner compressor exit diffuser. The gas turbine engine comprises a turbine section arranged downstream of the mid-frame section. The gas turbine engine comprises a seal assembly arranged at the forward side of the inner compressor exit diffusor.

According to an aspect, a seal assembly in a gas turbine is presented. The gas turbine engine comprises an outlet guide vane assembly interfacing with a forward side of an inner compressor exit diffuser. The seal assembly comprises at least a seal arranged at the forward side of the inner compressor exit diffusor.

According to an aspect, a method for reducing a leakage in a gas turbine engine is presented. The gas turbine engine comprises an outlet guide vane assembly interfacing with a forward side of an inner compressor exit diffuser. The method comprises arranging a seal assembly at the forward side of the inner compressor exit diffuser.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings:

FIGS. 2 to 8 are schematic section views of a seal assembly in a gas turbine engine according to various embodiments of the present invention;

To facilitate understanding, identical reference numerals have been used, where possible, to designate identical elements that are common to the figures.

DETAILED DESCRIPTION OF THE INVENTION

A detailed description related to aspects of the present invention is described hereafter with respect to the accompanying figures.

For illustration purpose, term "axial" or "axially" refers to a direction along a longitudinal axis of a gas turbine engine, term "radial" or "radially" refers to a direction perpendicular to the longitudinal axis of the gas turbine engine, term "downstream" or "aft" refers to a direction along a flow direction, term "upstream" or "forward" refers to a direction against the flow direction.

Figure 1:
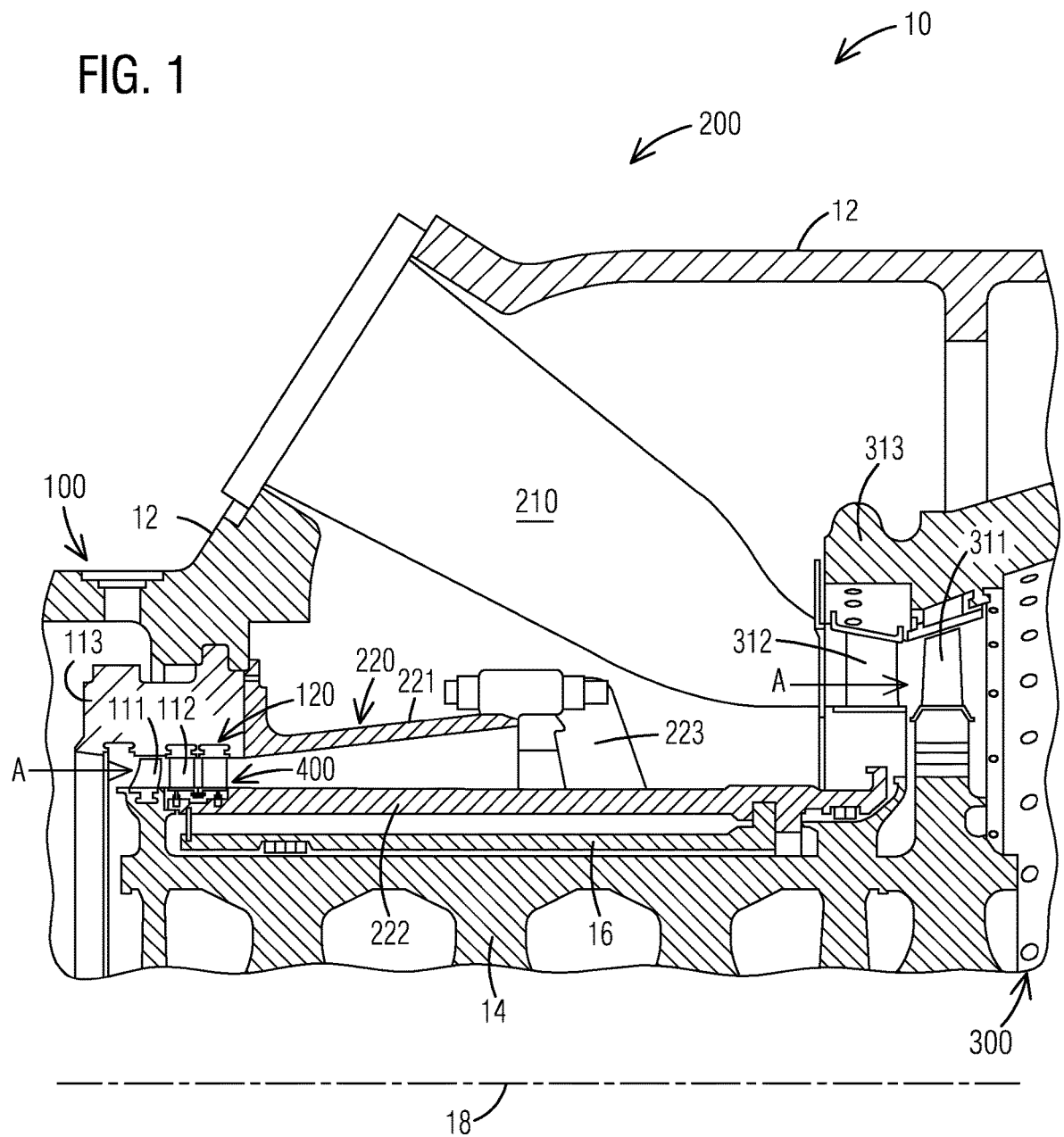
FIG. 1 is a schematic longitudinal section view of a portion of a gas turbine engine according to an embodiment of the present invention.

FIG. 1 illustrates a schematic longitudinal section view of a portion of a gas turbine engine 10 according to an embodiment of the present invention. As illustrated in FIG. 1, the gas turbine engine 10 includes a plurality of components along a longitudinal axis 18. The plurality of components may include a compressor section 100, a turbine section 300 located downstream of the compressor section 100 with respect to a flow direction A, and a mid-frame section 200 that is located there between. The gas turbine engine 10 also includes an outer casing 12 that encloses the plurality of components. A rotor 14 longitudinally connects the compressor section 100, the mid-frame section 200 and the turbine section 300 and is circumferentially enclosed thereby. The rotor 14 may be partially or fully enclosed by a shaft cover 16.

The compressor section 100 includes multiple stages of compressor rotating blades 111 and compressor stationary vanes 112. FIG. 1 only shows the last stage of compressor rotating blade 111 and compressor stationary vane 112. An outlet guide vane assembly 120 is arranged downstream of the last stage compressor vane 112. The compressor blades 111 are installed into the rotor 14. The compressor vanes 112 and the outlet guide vane assembly 120 are installed into a compressor vane carrier 113. The compressor vane carrier 113 interfaces with the outer casing 12. The turbine section 300 includes multiple stages of turbine stationary vanes 312 and turbine rotating blades 311. FIG. 1 only shows the first stage of turbine stationary vane 312 and turbine rotating blade 311. The turbine vanes 312 are installed into a turbine vane carrier 313. The turbine vane carrier 313 interfaces with the outer casing 12. The turbine blades 311 are installed into the rotor 14. The mid-frame section 200 typically includes a combustor assembly 210 and a compressor exit diffuser 220. The compressor exit diffuser 220 is located downstream of the outlet guide vane assembly 120.

The compressor exit diffusor 220 typically includes an outer compressor exit diffusor 221 and an inner compressor exit diffusor 222. The outer compressor exit diffusor 221 is connected to the inner compressor exit diffusor 222 by bolting to a strut 223. The inner compressor exit diffusor 222 may enclose the shaft cover 16. Forward side of the outer compressor exit diffusor 221 interfaces with the outer casing 12. Forward side of the inner compressor exit diffusor 222 interfaces with the last stage compressor vane 112 and the outlet guide vane assembly 120.

In operation of the gas turbine engine 10, the compressor section 100 inducts air via an inlet duct (not shown). The air is compressed and accelerated in the compressor section 100 while passing through the multiple stages of compressor rotating blades 111 and compressor stationary vanes 112, as indicated by the flow direction A. The compressed air passes through the outlet guide vane assembly 120 and enters the compressor exit diffuser 220. The compressor exit diffuser 200 diffuses the compressed air to the combustor assembly 210. The compressed air is mixed with fuel in the combustor assembly 210. The mixture is ignited and burned in the combustor assembly 210 to form a combustion gas. The combustion gas enters the turbine section 300, as indicated by the flow direction A. The combustion gas is expanded in the turbine section 300 while passing through the multiple stages of turbine stationary vanes 312 and turbine rotating blades 311 to generate mechanical power which drives the rotor 14. The rotor 14 may be linked to an electric generator (not shown) to convert the mechanical power to electrical power. The expanded gas constitutes exhaust gas and exits the gas turbine engine 10.

In operation, due to the high temperature of the combustion gas, cooling air is used to cool the turbine blades 311 and vanes 312 to maintain an adequate component life. Cooling air may leak at the forward side of the inner compressor exit diffusor 222. Cooling air leakage may negatively affect the performance and efficiency of the gas turbine engine 10. According to embodiments of the present invention, a seal assembly 400 may be arranged at the forward side of the inner compressor exit diffusor 222 to reduce cooling air leakage.

FIG. 2 is a schematic longitudinal section view of a seal assembly 400 in a gas turbine engine 10 according to an embodiment of the present invention. The seal assembly 400 is arranged radially between the outlet guide vane assembly 120 and the forward side of the inner compressor exit diffusor 222 to reduce cooling air leakage therebetween. The seal assembly 400 may circumferentially surround the outlet guide vane assembly 120 or the forward side of the inner compressor exit diffusor 222. As shown in the exemplary embodiment of FIG. 2, the outlet guide vane assembly 120 includes an outlet guide vane airfoil 121 extending radially between an airfoil root 122 and an inner platform 123. The outlet guide vane airfoil 121, the airfoil root 122 and the inner platform 123 may be manufactured as an integral piece. The airfoil root 122 is installed into the compressor vane carrier 113. The inner platform 123 may be axially extended toward upstream by connecting to an inner shroud 124 via flanges 125 forming an extended inner shroud 126 in the axially direction. It is understood that the inner platform 123 and the inner shroud 124 may be connected to each other by any suitable means or may be integrally manufactured as one piece.

The seal assembly 400 includes at least one seal 410. According to an exemplary embodiment, the at least one seal 410 may be a brush seal 410. The brush seal 410 is mounted in the inner compressor exit diffusor 222 at the forward side and radially engages the outlet guide vane assembly 120. The seal assembly 400 may circumferentially surround the forward side of the inner compressor exit diffusor 222. The brush seal 410 has a housing 411 and a plurality of bristles 412. The housing 411 may have a U-shape. The plurality of bristles 412 is secured within the housing 411. The inner compressor exit diffusor 222 includes a seal groove 224. The seal groove 224 may have a U-shape. The housing 411 of the brush seal 410 is installed into the seal groove 224 on the inner compressor exit diffusor 222. The housing 411 and the seal groove 224 are dimensioned to form a tight fit against each other. A radial length of the plurality of bristles 412 is dimensioned to provide sufficient air tight sealing contact against a sealing surface 420 to reduce cooling air leakage therebetween. The sealing surface 420 may be a bottom surface 127 of the extended inner shroud 126 of the outlet guide vane assembly 120.

According to an aspect of the invention, the seal assembly 400 may include a plurality of brush seals 410. The plurality of brush seals 410 may be arranged radially between the outlet guide vane assembly 120 and the forward side of the inner compressor exit diffusor 222 and tandem along the axial direction of the gas turbine engine 10 at the forward side of the inner compressor exit diffusor 222. As shown in the exemplary embodiment of FIG. 2, the seal assembly 400 includes dual brush seals 410 located upstream and downstream respectively. The dual brush seals 410 are mounted in the inner compressor exit diffusor 222 and radially engage the outlet guide vane assembly 120. The inner compressor exit diffusor 222 includes dual seal grooves 422 located upstream and downstream respectively at the forward side. The housing 411 of the upstream brush seal 410 is installed into the upstream seal groove 224. The housing 411 of the downstream brush seal 410 is installed into the downstream seal groove 224. A radial length of the bristles 412 is dimensioned to provide sufficient air tight sealing contact against a sealing surface 420 to reduce cooling air leakage therebetween. The sealing surface 420 may be a bottom surface 127 of the extended inner shroud 126 of the outlet guide vane assembly 120.

FIG. 3 is a schematic longitudinal section view of a seal assembly 400 in a gas turbine engine 10 according to an embodiment of the present invention. The seal assembly 400 is arranged radially between the outlet guide vane assembly 120 and the forward side of the inner compressor exit diffusor 222 to reduce cooling air leakage therebetween. The seal assembly 400 may circumferentially surround the outlet guide vane assembly 120. The seal assembly 400 includes at least one seal 410. In the exemplary embodiment shown in FIG. 3, the at least one seal 410 may be a brush seal 410. The brush seal 410 is mounted in the outlet guide vane assembly 120 and radially engages the inner compressor exit diffusor 222. The outlet guide vane assembly 120 includes a seal groove 128 at bottom side of the extended inner shroud 126. The brush seal 410 is mounted in the outlet guide vane assembly 120 by installing the housing 411 into the seal groove 128 on the outlet guide vane assembly 120. A radial length of the plurality of bristles 412 is dimensioned to provide sufficient air tight sealing contact against a sealing surface 420 to reduce cooling air leakage therebetween. The sealing surface 420 may be a top surface 225 of the inner compressor exit diffusor 222.

According to an aspect of the invention, the seal assembly 400 may include a plurality of brush seals 410. The plurality of brush seals 410 may be arranged radially between the outlet guide vane assembly 120 and the forward side of the inner compressor exit diffusor 222 and tandem along an axial direction of the gas turbine engine 10 at the forward side of the inner compressor exit diffusor 222. As shown in the exemplary embodiment of FIG. 3, the seal assembly 400 includes dual brush seals 410 located upstream and downstream respectively. The dual brush seals 410 are mounted in the outlet guide vane assembly 120 and radially engage the inner compressor exit diffusor 222. The outlet guide vane assembly 120 includes dual seal grooves 128 located upstream and downstream respectively at bottom side of the extended inner shroud 126. The housing 411 of the upstream brush seal 410 is installed into the upstream seal groove 128. The housing 411 of the downstream brush seal 410 is installed into the downstream seal groove 128. A radial length of the plurality of bristles 412 of the dual brush seals 410 is dimensioned to provide sufficient air tight sealing contact against a sealing surface 420 to reduce cooling air leakage therebetween. The sealing surface 420 may be a top surface 225 of the inner compressor exit diffusor 222.

Figure 4:
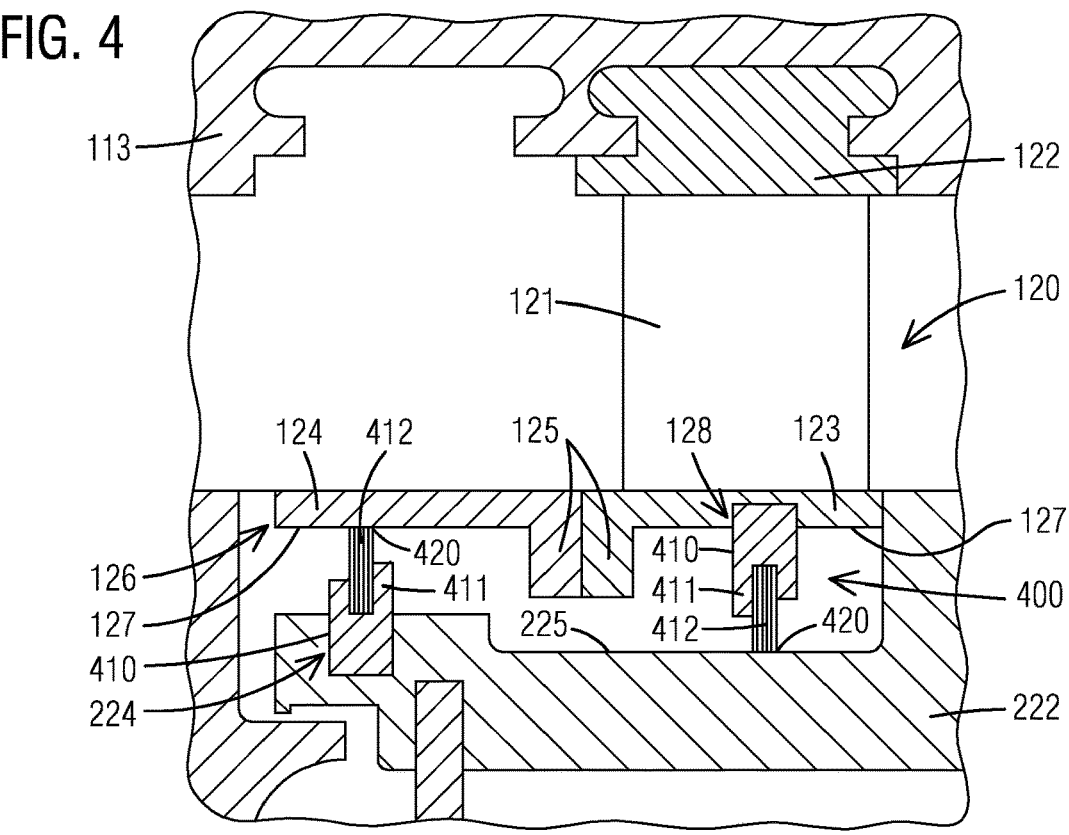

FIG. 4 is a schematic longitudinal section view of a seal assembly 400 in a gas turbine engine 10 according to an embodiment of the present invention. The seal assembly 400 is arranged radially between the outlet guide vane assembly 120 and the forward side of the inner compressor exit diffusor 222 reduce cooling air leakage therebetween. As shown in the exemplary embodiment of FIG. 4, the seal assembly 400 includes dual brush seals 410 located upstream and downstream respectively. The upstream brush seal 410 is mounted in the inner compressor exit diffusor 222 and radially engages the outlet guide vane assembly 120. The downstream brush seal 410 is mounted in the outlet guide vane assembly 120 and radially engages the inner compressor exit diffusor 222. A radial length of the bristles 412 of the dual brush seals 410 is dimensioned to provide sufficient air tight sealing contact against a sealing surface 420 to reduce cooling air leakage therebetween. In the illustrated embodiment of FIG. 3, the sealing surface 420 for the upstream brush seal 410 is a bottom surface 127 of the extended inner shroud 126 of the outlet guide vane assembly 120. The sealing surface 420 for the downstream brush seal 410 is a top surface 225 of the inner compressor exit diffusor 222. FIG. 4 is for illustration purpose only. It is understood that the plurality of brush seals 410 may be arranged radially between the outlet guide vane assembly 120 and the forward side of the inner compressor exit diffusor 222 and tandem along the axial direction in any configurations. For example, the upstream brush seal 410 may be mounted in the outlet guide vane assembly 120 and radially engages the inner compressor exit diffusor 222, and the downstream brush seal 410 may be mounted in the inner compressor exit diffusor 222 and radially engages the outlet guide vane assembly 120.

Figure 5:
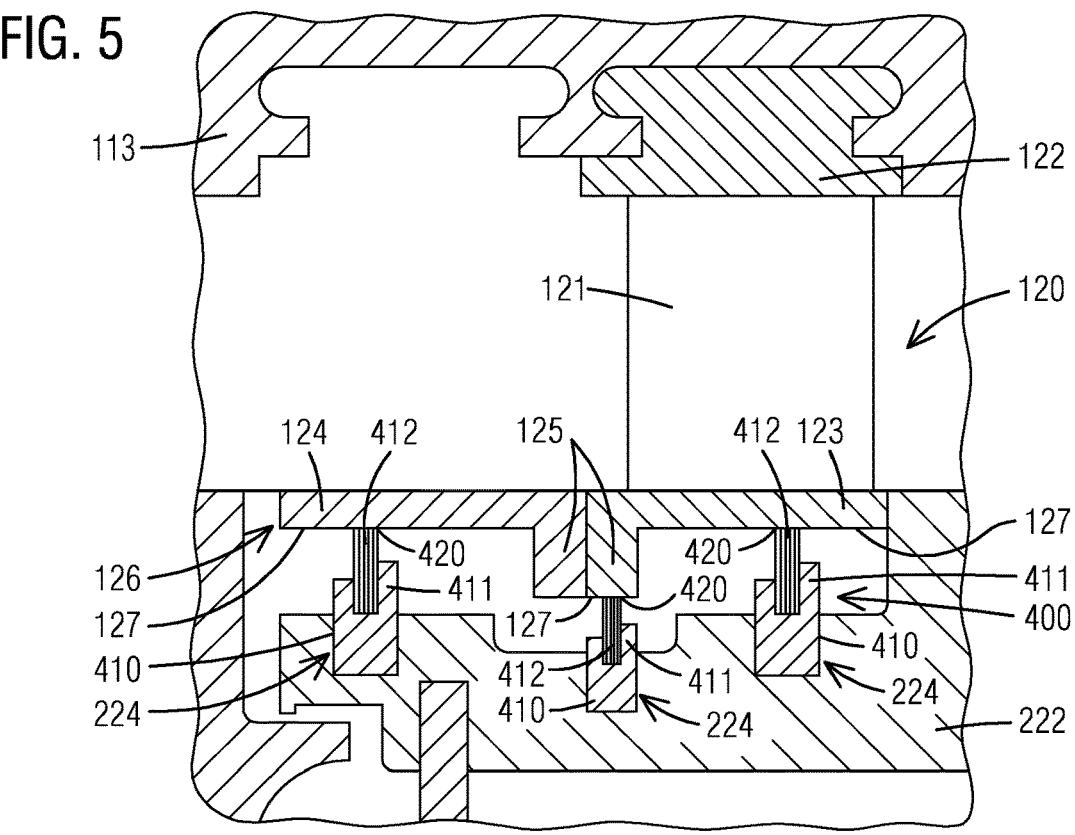
Figure 6:
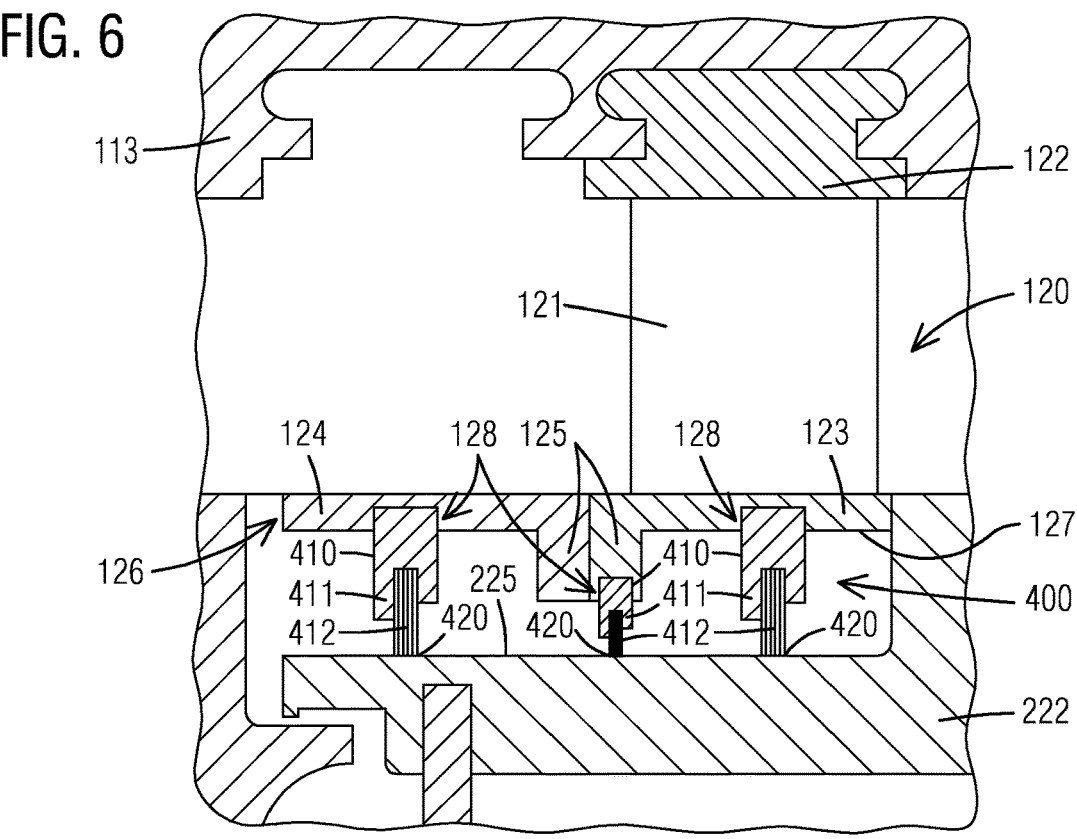
Figure 7:
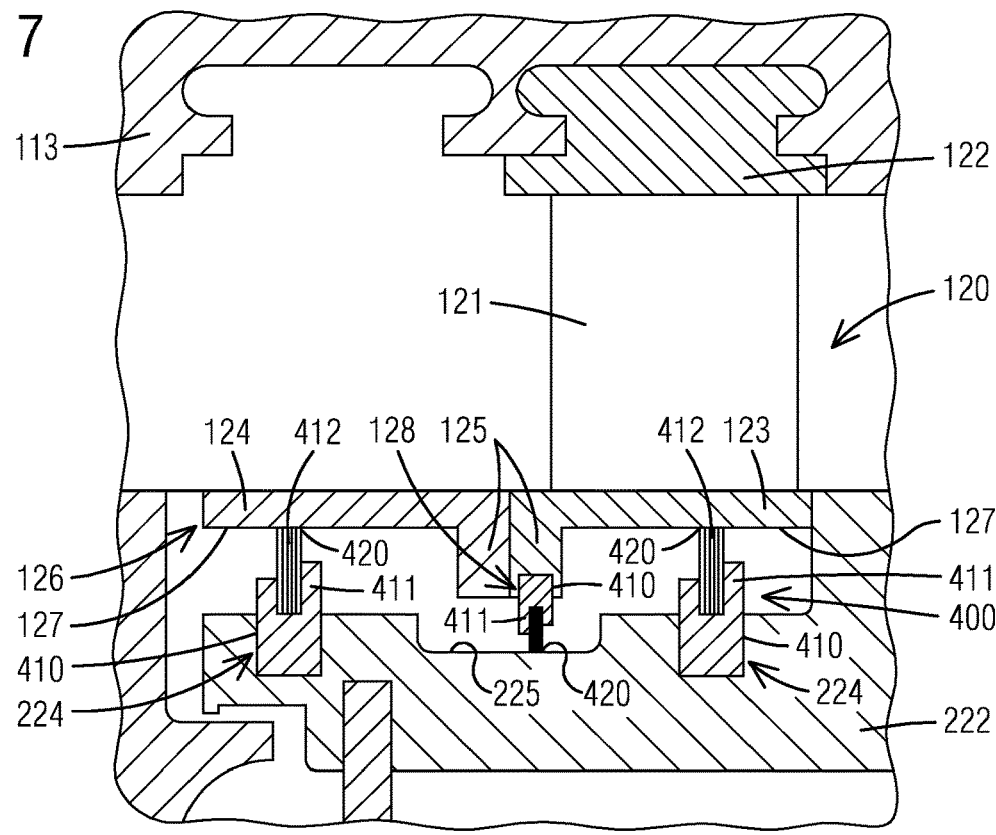

FIGS. 5 to 7 illustrate schematic longitudinal section views of a seal assembly 400 in a gas turbine engine 10 according to various embodiments of the present invention. The seal assembly 400 is arranged radially between the outlet guide vane assembly 120 and the forward side of the inner compressor exit diffusor 222 to reduce cooling air leakage therebetween. As shown in the exemplary embodiment of FIG. 5, the seal assembly 400 includes three brush seals 410 arranged tandem along the axial direction at the forward side of the inner compressor exit diffusor 222. The three brush seals 410 are mounted in the inner compressor exit diffusor 222 and radially engage the outlet guide vane assembly 120. As shown in the exemplary embodiment of FIG. 6, the seal assembly 400 includes three brush seals 410 arranged tandem along the axial direction. The three brush seals 410 are mounted in the outlet guide vane assembly 120 and radially engage the inner compressor exit diffusor 222. As shown in the exemplary embodiment of FIG. 7, the seal assembly 400 includes three brush seals 410 arranged tandem along the axial direction at the forward side of the inner compressor exit diffusor 222. Two of the three brush seals 410 are mounted in the inner compressor exit diffusor 222 and radially engages the outlet guide vane assembly 120. One of the three brush seals 410 is mounted in the outlet guide vane assembly 120 and radially engages the inner compressor exit diffusor 222. The figures are for illustration purpose only. It is understood the seal assembly 400 may include any number of brush seals 410. The brush seals 410 may be mounted in the inner compressor exit diffusor 222 and/or the outlet guide vane assembly 120 in any configurations.

Figure 8:
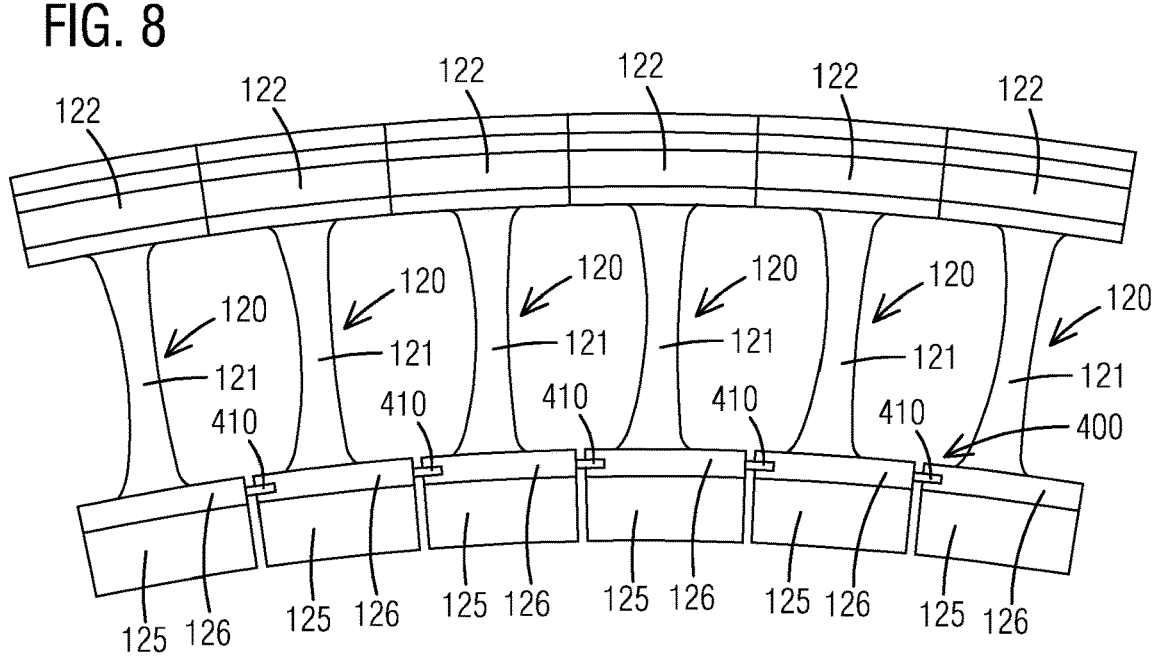

FIG. 8 is a schematic partial circumferential section view of a seal assembly 400 in a gas turbine engine 10 according to an embodiment of the present invention. The gas turbine engine 10 includes a plurality of outlet guide vane assemblies 120. The plurality of outlet guide vane assemblies 120 are circumferentially arranged. The plurality of outlet guide vane assemblies 120 forms an annular shape that interfaces with the forward side of the inner compressor exit diffusor 222. A tangential gap may exist between adjacent outlet guide vane assemblies 120. As shown in the exemplary embodiment of FIG. 8, the seal assembly 400 is arranged circumferentially between adjacent outlet guide vane assemblies 120 to reduce cooling air leakage therebetween. The seal assembly 400 may extend axially along the adjacent outlet guide vane assemblies 120. The seal assembly 400 includes at least one seal 410. The at least one seal 410 is mounted in an extended inner shroud 126 of one outlet guide vane assembly 120 and circumferentially engages an extended inner shroud 126 of an adjacent outlet guide vane assembly 120. The at least one seal 410 may be a brush seal 410. FIG. 8 is for illustration purpose only. It is understood that the at least one seal 410 may be mounted in a flange 125 of one outlet guide vane assembly 120 and circumferentially engages a flange 125 of an adjacent outlet guide vane assembly 120. It is also understood that a plurality of seals 410 may be arranged circumferentially between adjacent outlet guide vane assemblies 120 and tandem along the axial direction.

The seal assembly 400 may include any combinations of various embodiments. For example, the seal assembly 400 may include at least one seal 410 arranged radially between the outlet guide vane assembly 120 and the forward side of the inner compressor exit diffusor 222 to reduce cooling air leakage therebetween and at least another seal 410 arranged circumferentially between adjacent outlet guide vane assemblies 120 to reduce cooling air leakage therebetween.

Figure 9:
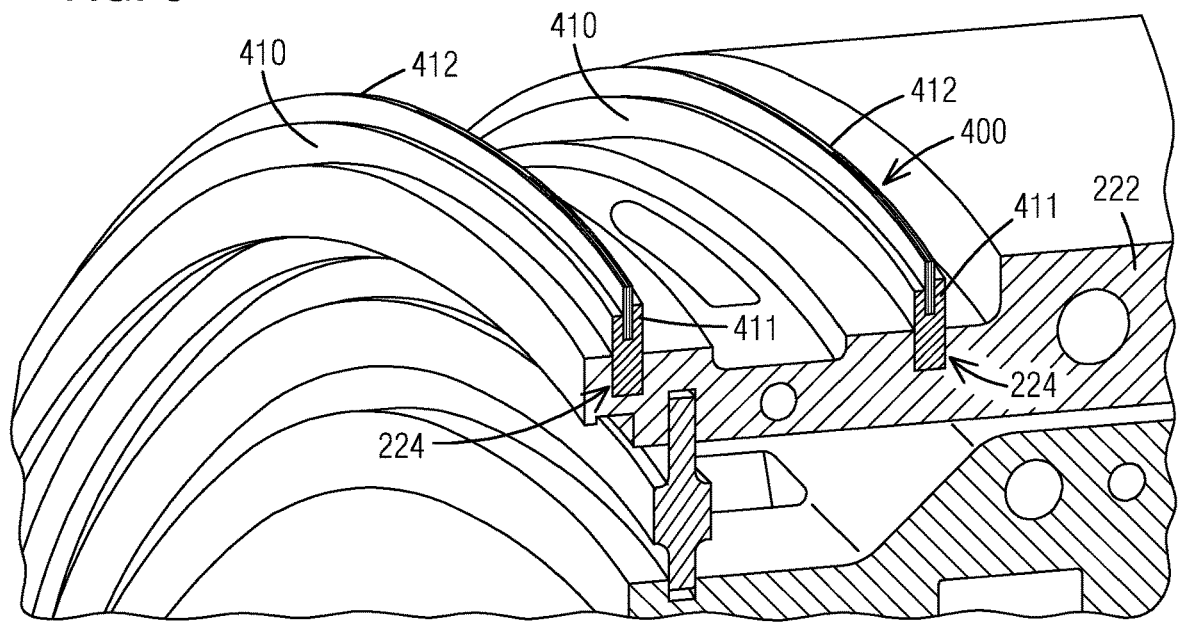
FIG. 9 is a schematic perspective portion view of a seal assembly in a gas turbine engine according to an embodiment of the present invention.

FIG. 9 is a schematic perspective partial view of a seal assembly 400 installed in a gas turbine engine 10 according to the embodiment of the present invention illustrated in FIG. 2. As shown in the exemplary embodiment of FIG. 9, the seal assembly 400 includes dual brush seals 410 arranged radially at the forward side of the inner compressor exit diffusor 222. The dual brush seals 410 are located upstream and downstream respectively. The dual brush seals 410 are mounted in the inner compressor exit diffusor 222 and radially engage the outlet guide vane assembly 120, as shown in FIG. 2. The inner compressor exit diffusor 222 includes dual seal grooves 422 located upstream and downstream respectively at the forward side of the inner compressor exit diffusor 222. The housing 411 of the upstream brush seal 410 is installed into the upstream seal groove 224. The housing 411 of the downstream brush seal 410 is installed into the downstream seal groove 224. The seal assembly 400 may circumferentially surround the forward side of the inner compressor exit diffusor 222.

Figure 10:
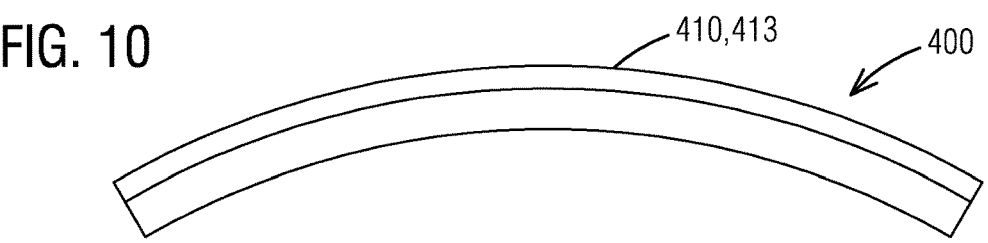
FIG. 10 is a schematic view of a seal segment of a seal assembly according to an embodiment of the present invention.

The at least one seal 410 may include a plurality of seal segments. FIG. 10 illustrates a schematic view of a seal segment 413 of a seal 410 in a seal assembly 400 according to an embodiment of the present invention. The seal segment 413 may have a circular shape. The seal segment 413 may have any circular degrees, for example, 45 degree, 60 degree, 90 degree, or 180 degree. The plurality of the seal segments 413 may form an annular seal 410 surrounding the inner compressor exit diffusor 222. For example, the seal 410 may include six 60 degree seal segments 413. Clearance may exist between adjacent seal segments 413 for thermal expansion.

According to an aspect, the proposed seal assembly 400 may reduce cooling air leakage in a gas turbine engine 10. The seal assembly 400 may be arranged at a forward side of an inner compressor exit diffusor 222 of the gas turbine engine 10. The seal assembly 400 may be arranged radially between the outlet guide vane assembly 120 and the forward side of the inner compressor exit diffusor 222 to reduce cooling air leakage therebetween. The seal assembly 400 may be arranged circumferentially between adjacent outlet guide vane assemblies 120 to reduce cooling air leakage therebetween. The proposed seal assembly 400 may reduce cooling air leakage in a gas turbine engine 10 and thus improve efficiency and performance of the gas turbine engine 10.

According to an aspect, the proposed seal assembly 400 may include at least one seal 410. The at least one seal 410 may be a brush seal 410.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

10: Gas Turbine Engine
12: Outer Casing
14: Rotor
16: Shaft Cover
18: Longitudinal Axis
100: Compressor Section
111: Compressor Blade
112: Compressor Vane
113: Compressor Vane Carrier
120: Outlet Guide Vane Assembly
121: Outlet Guide Vane Airfoil
122: Airfoil Root
123: Inner Platform
124: Inner Shroud
125: Flange
126: Extended Inner Shroud
127: Bottom Surface of Extended Inner Shroud
128: Seal Groove on Extended Inner Shroud
200: Mid-Frame Section
210: Combustor Assembly
220: Compressor Exit Diffusor
221: Outer Compressor Exit Diffusor
222: Inner Compressor Exit Diffusor
223: Strut
224: Seal Groove on Inner Compressor Exit Diffusor
225: Top Surface of Inner Compressor Exit Diffusor
300: Turbine Section
311: Turbine Blade
312: Turbine Vane
313: Turbine Vane Carrier
400: Seal Assembly
410: Brush Seal
411: Housing of Brush Seal
412: Bristle of Brush Seal
413: Seal Segment
420: Sealing Surface

What is claimed is:

1. A gas turbine engine comprising:
a compressor section comprising an outlet guide vane assembly;
a mid-frame section arranged downstream of the compressor section, wherein the mid-frame section comprises an inner compressor exit diffuser, wherein the outlet guide vane assembly interfaces with a forward side of the inner compressor exit diffuser;
a turbine section arranged downstream of the mid-frame section; and
a seal assembly arranged at the forward side of the inner compressor exit diffusor,
wherein the seal assembly is radially arranged between the outlet guide vane assembly and the forward side of the inner compressor exit diffusor,
wherein the seal assembly comprises a plurality of brush seals arranged tandem along an axial direction, wherein at least one of the plurality of brush seals is mounted in the inner compressor exit diffuser and radially engages the outlet guide vane assembly, and wherein at least another one of the plurality of brush seals is mounted in the outlet guide vane assembly and radially engages the inner compressor exit diffusor.

2. The gas turbine engine as claimed in claim 1, wherein the compressor section comprises a plurality of outlet guide vane assemblies circumferentially arranged, and wherein the seal assembly is arranged circumferentially between adjacent outlet guide vane assemblies.

3. The gas turbine engine as claimed in claim 1, wherein the seal assembly comprises a plurality of seal segments.

4. A seal assembly in a gas turbine engine, wherein the gas turbine engine comprises an outlet guide vane assembly interfacing with a forward side of an inner compressor exit diffuser, the seal assembly comprising:
    at least one seal arranged at the forward side of the inner compressor exit diffusor,
    wherein the at least one seal is arranged radially between the outlet guide vane assembly and the forward side of the inner compressor exit diffusor,
    further comprising a plurality of brush seals arranged tandem along an axial direction, wherein at least one of the plurality of brush seals is mounted in the inner compressor exit diffusor and radially engages the outlet guide vane assembly, and wherein at least another one of the plurality of brush seals is mounted in the outlet guide vane assembly and radially engages the inner compressor exit diffusor.

5. The seal assembly as claimed in claim 4, wherein the gas turbine comprises a plurality of outlet guide vane assemblies circumferentially arranged, and wherein the at least one seal is arranged circumferentially between adjacent outlet guide vane assemblies.

6. The seal assembly as claimed in claim 4, wherein the at least one seal comprises a plurality of seal segments.

7. A method for reducing a leakage in a gas turbine engine, wherein the gas turbine engine comprises an outlet guide vane assembly interfacing with a forward side of an inner compressor exit diffuser, the method comprising:
    arranging a seal assembly at the forward side of the inner compressor exit diffuser,
    wherein the seal assembly is arranged radially between the outlet guide vane assembly and the forward side of the inner compressor exit diffusor,
    wherein the seal assembly comprises a plurality of brush seals arranged tandem along an axial direction, and wherein the seal assembly is arranged by mounting at least one of the plurality of brush seals in the inner compressor exit diffusor and radially engaging the inner compressor exit diffuser and mounting at least another one of the plurality of brush seals in the outlet guide vane assembly and radially engaging the inner compressor exit diffuser.

8. The method as claimed in claim 7, wherein the gas turbine comprises a plurality of outlet guide vane assemblies circumferentially arranged, and wherein the seal assembly is arranged circumferentially between adjacent outlet guide vane assemblies.

\* \* \* \* \*